(12) United States Patent
Smith

(10) Patent No.: US 10,954,820 B2
(45) Date of Patent: Mar. 23, 2021

(54) NON-CONTACTING SEAL WITH NON-ABRADABLE COATING

(71) Applicant: PRATT & WHITNEY CANADA CORP., Longueuil (CA)

(72) Inventor: Alexander Smith, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 87 days.

(21) Appl. No.: 15/884,775

(22) Filed: Jan. 31, 2018

(65) Prior Publication Data
US 2019/0234240 A1    Aug. 1, 2019

(51) Int. Cl.
| | |
|---|---|
| F01D 25/18 | (2006.01) |
| F16J 15/44 | (2006.01) |
| F16J 15/28 | (2006.01) |
| F02C 7/28 | (2006.01) |
| F02C 7/06 | (2006.01) |

(52) U.S. Cl.
CPC ......... F01D 25/186 (2013.01); F01D 25/183 (2013.01); F16J 15/28 (2013.01); F16J 15/441 (2013.01); F16J 15/442 (2013.01); F02C 7/06 (2013.01); F02C 7/28 (2013.01); F05D 2240/50 (2013.01); F05D 2240/55 (2013.01); F05D 2260/38 (2013.01); F05D 2260/98 (2013.01); F05D 2270/42 (2013.01); F05D 2300/20 (2013.01); F05D 2300/611 (2013.01)

(58) Field of Classification Search
CPC ...... F01D 25/186; F01D 11/02; F01D 11/025; F01D 11/001; F01D 25/183; F16J 15/28; F16J 15/441; F16J 15/3496; F16C 33/72

USPC ................................. 415/230; 277/411, 345
See application file for complete search history.

(56) References Cited

U.S. PATENT DOCUMENTS

| | | | | |
|---|---|---|---|---|
| 2,318,360 | A * | 5/1943 | Benner | C09K 3/1427 51/309 |
| 2,867,458 | A * | 1/1959 | Kroekel | F16J 15/441 277/543 |
| 2,956,824 | A * | 10/1960 | Kuchler | F01D 11/003 277/500 |
| 3,810,637 | A | 5/1974 | Bonvin | |
| 4,934,254 | A | 6/1990 | Clark et al. | |
| 5,474,307 | A | 12/1995 | DeBiasse et al. | |
| 5,536,022 | A * | 7/1996 | Sileo | C23C 4/02 277/415 |
| 5,955,145 | A * | 9/1999 | Kalvala | C23C 18/1283 427/246 |
| 7,222,861 | B2 * | 5/2007 | Gittler | F03B 11/006 277/422 |

(Continued)

*Primary Examiner* — Kenneth Bomberg
*Assistant Examiner* — Jason Mikus
(74) *Attorney, Agent, or Firm* — Norton Rose Fulbright Canada LLP

(57) ABSTRACT

There is provided a non-contacting seal assembly for a gas turbine engine, having a housing that houses a sealing ring; and a counter component cooperating with the sealing ring. The sealing ring and the counter component are rotatable relative to each other about a central axis and define sealing faces circumferentially extending around the central axis. The sealing faces face each other and are spaced apart from each other by a controlled gap. At least one of the sealing faces is coated with a non-abradable material. A method of operating a non-contacting seal assembly is also provided.

18 Claims, 2 Drawing Sheets

(56) References Cited

U.S. PATENT DOCUMENTS

| | | | | |
|---|---|---|---|---|
| 7,754,350 B2* | 7/2010 | Freling | ............... | C23C 4/06 |
| | | | | 427/456 |
| 2003/0082297 A1* | 5/2003 | Wolkers | ............ | B23P 6/002 |
| | | | | 427/140 |
| 2014/0265151 A1* | 9/2014 | Vasagar | ............ | F01D 11/003 |
| | | | | 277/500 |
| 2016/0032765 A1* | 2/2016 | Shuaib | ............ | F01D 25/125 |
| | | | | 277/348 |

\* cited by examiner

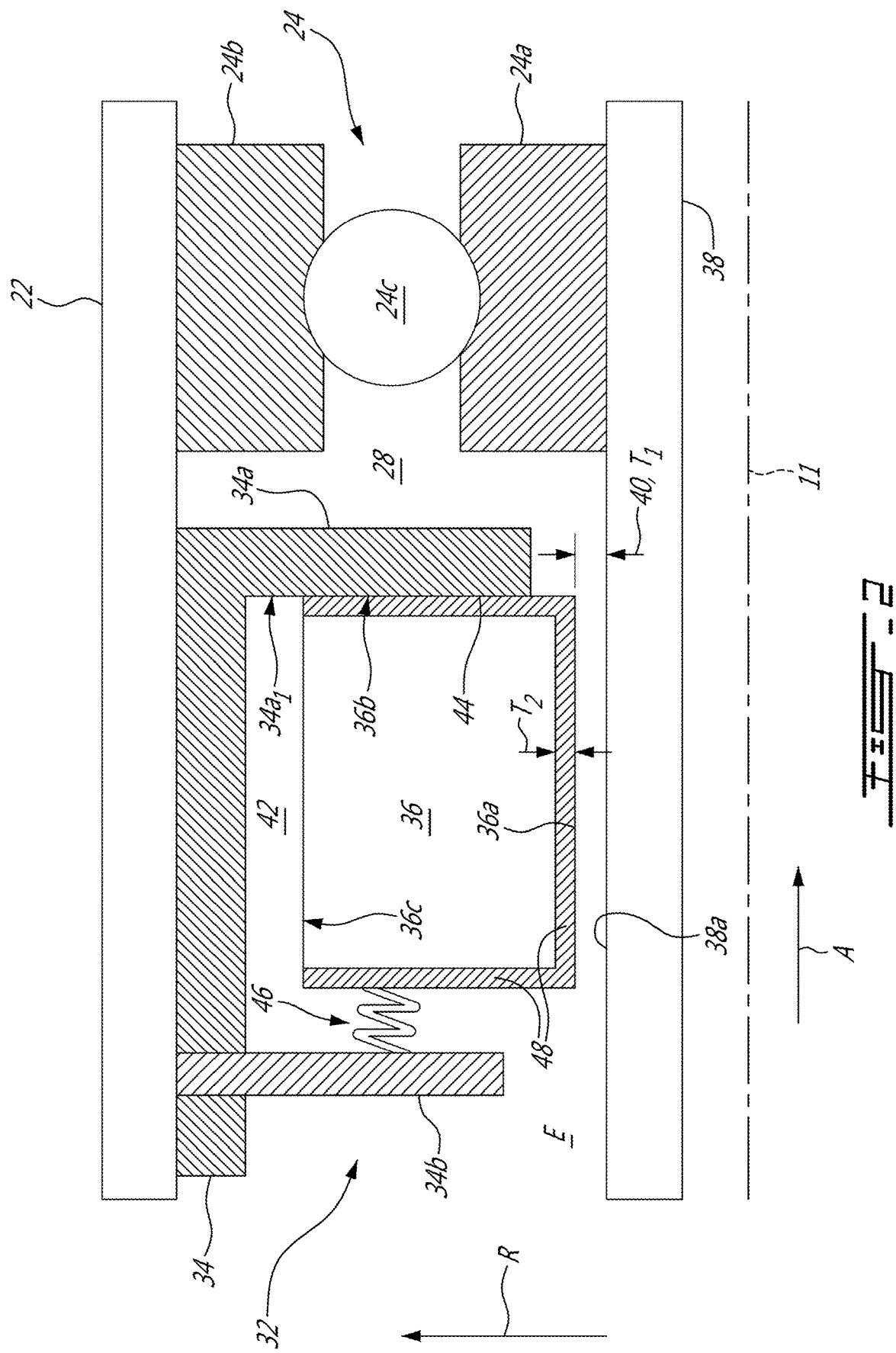

NON-CONTACTING SEAL WITH NON-ABRADABLE COATING

TECHNICAL FIELD

The application relates generally to seals and, more particularly, to non-contacting seals used to maintain a pressure difference between two zones.

BACKGROUND OF THE ART

Seals are typically used in gas turbine engines to partition a bearing cavity from a higher pressure environment. Seals typically have two complementary components, and it is common to refer to one of these as a sealing ring and to the other as a runner or counter component.

A non-contacting seal has a sealing ring spaced apart from the runner by a controlled gap during typical operating conditions. Accordingly, the sealing ring is typically a continuous annular component. To limit the generation of heat upon any occurrences of contact across the gap, the sealing ring is often made of carbon, which has a relatively low degree of friction against the runner. However, carbon does not have the same thermal expansion coefficient as the runner which was typically made of a metal, and for the gap to remain relatively constant during typical operating conditions, the carbon ring is surrounded by a metallic ring referred to as a shrink band and which limited the thermal expansion of the carbon ring relative to the runner. There remained room for improvement.

SUMMARY

In accordance with one aspect, there is provided a non-contacting seal assembly for a gas turbine engine, the assembly comprising a housing that houses a sealing ring, the sealing ring annularly and continuously extending about a central axis of the seal assembly; and a counter component disposed concentrically with the sealing ring, the sealing ring and the counter component rotatable relative to each other about the central axis, the counter component cooperating with the sealing ring for defining respective sealing faces circumferentially extending around the central axis, the sealing faces facing and spaced apart from each other by a controlled gap, at least one of the sealing faces being coated with a non-abradable material.

In accordance with one other aspect, there is provided a gas turbine engine, comprising a component rotating about a central axis; an engine casing disposed concentrically with the central axis; a bearing outer ring secured to the engine casing and a bearing inner ring secured to the component, the bearing inner and outer rings cooperating for receiving roller elements therebetween, the bearing inner and outer rings located within a bearing cavity of the gas turbine engine; and a non-contacting seal assembly for fluidly separating the bearing cavity from an environment outside the bearing cavity, the non-contacting seal assembly having a sealing ring housed by the engine casing and annularly and continuously extending about the central axis of the non-contacting seal assembly, the sealing ring and the component rotatable relative to each other about the central axis, the component cooperating with the sealing ring for defining respective sealing faces circumferentially extending around the central axis, the sealing faces facing and spaced apart from each other by a controlled gap, at least one of the sealing faces being coated with a non-abradable material.

In accordance with still another aspect there is provided a method of operating a non-contacting seal assembly, comprising: rotating a sealing ring relative to a counter component about a central axis; fluidly connecting a bearing cavity to an environment outside the bearing cavity via a controlled gap defined between the sealing ring and the counter component; imparting a pressure differential between the environment and the bearing cavity for limiting lubricant of the bearing cavity from leaking in the environment; and avoiding a direct contact between a material of the sealing ring and a material of the counter component with a non-abradable material disposed on at least one of the sealing ring and the counter component at the controlled gap.

In one aspect, there is provided a non-contacting seal assembly for a gas turbine engine, comprising a sealing ring extending about a central axis of the seal assembly; and a counter component cooperating with the sealing ring and being disposed concentrically to the sealing ring, the sealing ring and the counter component being rotatable relative to each other about the central axis and defining sealing faces circumferentially extending around the central axis, the sealing faces facing each other and being spaced apart from each other by a controlled gap, at least one of the sealing faces being coated with a non-abradable material.

In a particular embodiment, the non-contacting seal can be a labyrinth seal having a sealing face of the seal assembly defining a plurality of teeth extending radially toward the counter component. The radial gap being defined between a remote end of the teeth and the sealing face of the counter component. Each of the teeth being coated with the non-abradable material. The sealing ring may be configured to be secured to an engine casing of the gas turbine engine.

DESCRIPTION OF THE DRAWINGS

Reference is now made to the accompanying figures in which:

FIG. 2 is a schematic cross-sectional view of a seal assembly in accordance with one embodiment.

DETAILED DESCRIPTION

Figure 1:
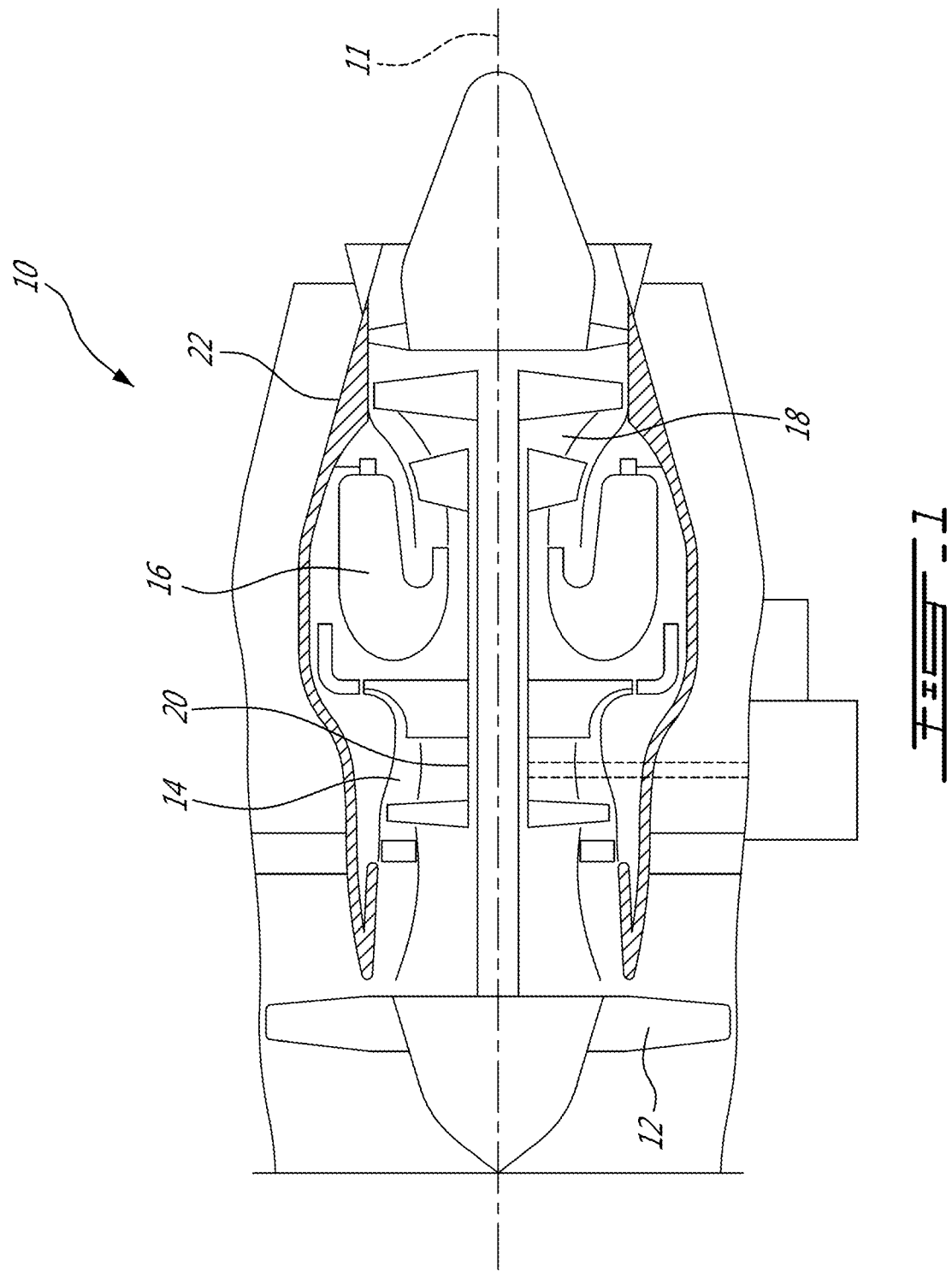
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotating about a central axis 11 of the gas turbine engine 10. The gas turbine engine 10 includes an engine shaft 20 and an engine casing 22 disposed circumferentially around the engine shaft 20. The engine casing 22 is in part used to support the engine shaft 24.

A gas turbine engine such as shown in FIG. 1 can include a plurality of bearings which are used to provide a low-friction interface between components which rotate relative to one another, such as between the high pressure shaft 20 and the low pressure shaft, or between the high pressure shaft and the engine casing. Typically, bearings are enclosed in chambers referred to as bearing cavities, and the bearing cavities are partitioned from the environment, which can be of significantly higher pressure, by seals on each axial side.

Referring now to FIG. 2, to allow smooth rotation between the casing 22 and the shaft 20, a bearing assembly 24 is disposed radially therebetween relative to the central axis 11. In the depicted embodiment, the bearing assembly 24 includes a bearing inner ring 24a that rotates about the central axis 11 and a bearing outer ring 24b secured to the engine casing 22. In the embodiment shown, the bearing inner ring 24a is configured to be secured to the shaft 20, either directly or via a runner (not shown) secured to the shaft 20. The bearing inner and outer rings 24a, 24b cooperate for receiving roller elements 24c (e.g., cylindrical rollers, balls) therebetween. The shaft 20 (FIG. 1) usually rotates at a high rotational speed. Therefore, the bearing assembly 24 is preferably lubricated. In the embodiment shown, the bearing assembly 24 is contained within a bearing cavity 28 of the engine 10. The bearing cavity 28 is defined radially between the engine casing 22 and the shaft 20 (FIG. 1).

Seals are typically used to contain the bearing lubricant within the bearing cavity 28. In the embodiment shown, a non-contacting seal assembly 32 is used to limit lubricant leakage out of the bearing cavity 28.

Herein, the expression "non-contacting seal" refers to a type of seal in which two complementary portions of the seal are designed to be spaced apart by a controlled gap during typical operating conditions. The small, controlled gap limits gas flow and thus maintains a positive pressure differential leading into the bearing cavity, and due to the positive pressure, the bearing lubricant is kept within the cavity. The gap may vary in size with, for instance, changes in the operating conditions, vibrations typically occurring during normal operations, and thermal expansion. In some cases, the two complementary portions may contact each other. Such contacts are typically limited during a mission. When they occur, the two components typically do not remain in contact for more than a second.

Although non-contacting seals come in different forms, such as controlled gap seals and labyrinth seals for instance, they differ from contacting seals. Indeed, in contacting seals, the two complementary portions of the seal are biased in an abutment contact against each other during normal operating conditions.

In a contacting seals, one of the two complementary portions is typically designed to wear with time due to the frictional contact. The wearing of one of the components can have a limiting effect on friction, and on the amount of heat that is generated by the friction. Nevertheless, such seals usually require a cooling mechanism to diffuse heat generated by the friction between the two complementary portions.

To maintain the frictional contact engagement, the biased complementary portion may be provided in the form of a segmented ring in which each of a plurality of circumferentially-interspaced segments can move radially independently from the others. The bias can be applied by a pressure differential for instance. By contrast, in the case of non-contacting seals, the complementary portions can each be formed of a single annular structure which can resist external forces. Stated otherwise, the complementary portions of a non-contacting seal are designed such as no resultant force are biasing the complementary portions against each other.

One of the challenge in non-contacting seal consists in limiting the gap between the two complementary portions to maintain a pressure differential between two zones spaced apart by the seal while precluding contacts between the complementary portions, and in maintaining a controlled gap throughout varying operating conditions. Some occasional contact is accepted. However, prolonged contact might result in excessive heat generation that might impair with a proper operation of the gas turbine engine.

In the embodiment shown, the non-contacting seal assembly 32 includes a housing 34 that houses a sealing ring 36. The sealing ring 36 annularly and continuously extends around the central axis 11. Stated otherwise, the sealing ring 36 is integral, as opposed to being formed of separate segments. The continuous aspect of the sealing ring 36 imparts a certain amount of structure, such as a continuous arch, which may allow to resist forces such as forces stemming from a pressure differential for instance, and to maintain the controlled gap. The seal assembly 32 includes a counter component 38 that cooperates with the sealing ring 36. The counter component 38 may correspond to the shaft 20 of the gas turbine engine 10, or to a runner secured thereto. The ring 36 and the counter component 38 are concentric about the central axis 11. In the depicted embodiment, the ring 36 is located radially outwardly to the counter component 38. It is understood that the housing 34 may be defined by the engine casing 22 such that the housing 22 is an integral part of the engine casing 34.

The counter component 38 and the sealing ring 36 rotate relative to each other about the central axis 11. Each of the counter component 38 and the ring 36 defines a sealing face 38a, 36a. The sealing faces 38a, 36a face each other and are spaced apart from each other by a controlled gap 40. In the embodiment shown, the controlled gap 40 is a radial gap that extends axially relative to the central axis 11. The radial gap 40 is taken along a radial direction R relative to the central axis 11.

The radial gap 40 fluidly connects the bearing cavity 28 with an environment E outside the bearing cavity 28. In the embodiment shown, to ensure that the lubricant contained within the bearing cavity 28 does not leak in the environment E, pressurized air (e.g. air taken from one or more compressor stage) can be used to increase an air pressure of the environment E beyond the pressure within the bearing cavity 28, thereby creating a positive pressure differential therebetween. A controlled, relatively small amount of compressed air continuously leaks from the environment E into the bearing cavity, which prevents leakage in the opposite direction.]

In the embodiment shown, the sealing ring 36 is radially spaced apart from the housing 34. This allows the sealing ring 36 to radially expand with a temperature increase. Stated otherwise, an increase in the temperature will cause the counter component 38 to increase in diameter. The sealing ring 36 will also be able to expand because of a radial space 42 located radially between the sealing ring 36 and the housing 34. On a particular embodiment, the radial gap 40 will vary as a function of the thermal growth of the sealing ring 36 minus the thermal growth of the counter component.

The radial space 42 might allow the sealing ring 36 to expand in diameter. However, fluid communication between the bearing cavity 28 and the environment E via the radial space 42 must be limited. To that extend, the sealing ring 36 defines an annular face 36b at an axial end thereof. The annular face 36b extends in the radial direction R from the sealing face 36a; radially outwardly therefrom in the embodiment shown. The annular face 36b is in axial contact with the housing 34. More specifically, the housing 34 defines a radial protrusion, or wall 34a that extends radially toward the counter component 38. The radial protrusion 34a defines an annular face $34a_1$. The annular faces $34a_1$, 36b of both the housing radial protrusion 34a and the sealing ring 36, when in contact, create a sealing interface 44 that limits air and/or lubricant from circulating between the housing 34 and the sealing ring 36. In this embodiment, the axial face is coated by a non-abradable material, but this is optional, and other embodiments may have an axial face which is not coated.

As aforementioned, the pressure in the environment E is greater than that within the bearing cavity 28. As such, the pressure differential biases the sealing ring 36 in abutment against the radial protrusion 34a. For some applications, the difference in pressures between the environment E and the cavity 28 might be sufficient to create a suitable force that maintains the sealing ring 36 in contact with the housing radial protrusion 34a.

In some other applications, a magnitude of the pressure differential is not sufficient in keeping the sealing ring 36 in abutment against the radial protrusion 34a. In the embodiment shown, the housing 34 further includes a retaining ring 34b secured to the housing 34 and extending radially away from the engine casing 22 toward the counter component 38. The retaining ring 34b is axially spaced apart from the radial protrusion 34a such that the sealing ring 36 is received axially between the retaining ring 34b and the radial protrusion 34a relative to the central axis 11. A biasing member 46, such as a spring, is disposed axially between the retaining ring 34b and the sealing ring 36. The biasing member 46 exerts an axial force which pushes the sealing ring 36 in an axial direction A against the radial protrusion 34a such that the sealing interface 44 between the annular faces 36b, 34$a_1$ of the sealing ring 36 and radial protrusion 34a is maintained throughout a whole mission of the engine 10 (FIG. 1).

As illustrated, the sealing ring 36 has two circumferential faces, one of them corresponds to the sealing ring sealing face 36a. The other, referred to herein below as the second face 36c, is radially spaced apart from the sealing ring sealing face 36a and is exposed to the environment E of the seal assembly 32. Stated otherwise, besides the pressure of the environment E, there is no other force exerted on the sealing ring second face 36c in the radial direction R. It is understood that a resultant of the pressure force from the environment E exerted on the second face 36c will be zero because the sealing ring 36 extends 360 degrees all around the central axis 11. Consequently, each pressure force exerted on the second face 36c at any given location is cancelled by a pressure force exerted on said surface 36c at another location that is diametrically opposed to the given location.

As aforementioned, the efficiency of the non-contacting seal assembly 32 is directly linked to its ability in maintaining a thickness $T_1$ of the radial gap 40 as small as possible without inducing contact between the counter component 38 and the sealing ring 36. One way to maintain this thickness $T_1$ might be to build the sealing ring 36 from a material having a coefficient of thermal expansion very similar or equal to that of a material of the counter component 38. In a particular embodiment, the sealing ring 36 and the counter component 38 are made of a same material.

Typically, the counter component 38 is made of a metallic material. This is often required so that it is able to withstand the high torsional force it is subjected to during operation of the gas turbine engine 10. In the embodiment shown, the sealing ring 36 is also made of a metallic material so that the thermal expansion of both the counter component 38 and the sealing ring 36 are similar when exposed to a given temperature variation. In the embodiment shown, the sealing ring is made of metal. The counter component is also made of metal. The metal can be steel or nickel for instance, or any other suitable metal for the specific application.

As previously mentioned, it is allowed that the components of the non-contacting seal assembly 32 contact each other for very short duration of time compared to the duration of the mission. Nevertheless, having a metal-to-metal contact might be dangerous because it might increase a risk of starting a fire. Therefore, in the embodiment shown, at least one of the sealing faces 36a, 38a of the sealing ring 36 and the counter component 38 is coated with a non-abradable material 48. In a particular embodiment, both of the sealing faces 36a, 38a of the sealing ring 36 and of the counter component 38 are coated with the non-abradable material 48. It is understood that more than one non-abradable material may be used, and that different coating materials can be used for the sealing ring 36 and for the counter component 38. For instance, in one embodiment, the counter component 38 can be coated with a material which wears slowly, but at a greater rate than a rate of wear of the sealing ring coating.

The expression non-abradable is used to refer to a material that is designed to resist abrasion during use, as opposed to materials which are designed specifically to abrade. For instance, carbon rings are typically used in aircraft engine seals, and the purpose of the carbon rings is to wear, though at a controlled and slow rate, when contacting a complementary portion. By contrast, non-abradable coatings are sometimes used on the complementary portion to the carbon ring so that when the carbon ring slides against the non-abradable coating, the wear of the non-abradable coating is insignificant compared to the wear of the carbon ring itself.

Stated otherwise, the expression "non-abradable" refers to a characteristic of a material that has a high resistivity against wear, and can impart a relatively low coefficient of friction when moved in contact against the counter component. It is understood that a wear-resistant material will wear with time, but at a rate that is substantially less than that of other materials. Non-abradable materials are known by persons skilled in the art as being distinct from wearing materials such as carbon.

The non-abradable coating 48 may be a ceramic-based coating, a tungsten carbide coating, a chromium carbide coating, a titanium-nitride coating, a diamond-based coating, or any suitable non-abradable coating known in the art. These coatings might be thermally sprayed against the sealing face(s). They may be deposited on the sealing face(s) by physical- or chemical-vapour deposition, or by any suitable deposition process known in the art.

In the embodiment shown, the non-abradable coating 48 has a Mohs scale hardness of at least 8, preferably above 8.5. As shown, a thickness $T_2$ of the non-abradable coating can be within the range of 0.0002" to 0.010".

It is understood that, in some embodiments, the sealing ring 36 may be located radially inwardly to the counter component 38 or radially outwardly to the counter component 38. The counter component 38 may correspond to the shaft 20 of the gas turbine engine 10 or to a runner secured to the shaft 20. Alternately, the housing 34 may be secured to the shaft 20 such that counter component is the engine casing 22. In such a situation, the radial gap 40 would be defined between the engine casing 22 and the sealing ring 36. Alternately, the seal assembly 32 may be disposed in an annular gap located radially between two concentric shafts. Other configurations are contemplated without departing from the scope of the present disclosure. In a particular embodiment, the control gap is an axial gap extending in the radial direction R. The control gap may also extend at an angle and obliquely relative to the central axis 11.

For operating the seal assembly 32, the sealing ring 36 is rotated relative to the counter component 38 about the central axis 11. The bearing cavity 38 is fluidly connected to the environment E via the radial gap 40 defined between the sealing ring 36 and the counter component 38. A pressure differential is imparted between the environment E and the bearing cavity 28 for limiting lubricant form leaking in the environment E. A direct contact is avoided between the material of the sealing ring 36 and the material of the counter component, which are metallic material(s), with the non-abradable material 48 deposed on at least one of the sealing ring 36 and the counter component 38 at the radial gap 40.

In a particular embodiment, using a sealing ring that is not made of carbon can allow for using a wider range of de-icing fluids that are known to deteriorate carbon. Moreover, a metallic sealing ring can be less susceptible to cracking, oxidation, exudation, fast wear at dry air conditions than a carbon sealing ring. Indeed, the properties of a carbon graphite can significantly vary as a function of the manufacturing process.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A non-contacting seal assembly for a gas turbine engine, the assembly comprising a housing that houses a sealing ring, the sealing ring made of a metallic material and being radially spaced apart from the housing, the sealing ring annularly and continuously extending about a central axis of the seal assembly, the sealing ring and the housing movable one relative to the other in a radial direction relative to the central axis; and a counter component disposed concentrically with the sealing ring, the sealing ring and the counter component rotatable relative to each other about the central axis, the counter component cooperating with the sealing ring for defining respective sealing faces circumferentially extending around the central axis, the sealing faces facing the radial direction relative to the central axis and spaced apart from each other by a controlled gap, at least one of the sealing faces being coated with a non-abradable material.

2. The non-contacting seal assembly of claim 1, wherein the sealing face of the sealing ring is coated with a non-abradable material.

3. The non-contacting seal assembly of claim 1, wherein the sealing ring has an annular face at an axial end thereof, the annular face extending from the sealing face in a radial direction relative to the central axis, the annular face being in axial contact with a wall of the engine casing that extends radially toward the counter component.

4. The non-contacting seal assembly of claim 3, further comprising a retaining ring secured to the housing and extending radially toward the counter component, the retaining ring being axially spaced apart from the wall relative to the central axis, the sealing ring being located axially between the wall and the retaining ring.

5. The non-contacting seal assembly of claim 3, further comprising a biasing member disposed axially between the retaining ring and the sealing ring for biasing the sealing ring into abutment against the wall.

6. The non-contacting seal assembly of claim 1, wherein both the sealing face of the sealing ring and of the counter component are coated with the non-abradable material.

7. The non-contacting seal assembly of claim 1, wherein the sealing ring and the counter component have a same coefficient of thermal expansion.

8. The non-contacting seal assembly of claim 1, wherein the non-abradable material is a ceramic-based coating.

9. The non-contacting seal assembly of claim 1, wherein a thickness of the non-abradable material is between 0.0002" and 0.010".

10. The non-contacting seal assembly of claim 1, wherein a Mohs scale hardness of the non-abradable material is at least 8.

11. A gas turbine engine, comprising a component rotating about a central axis; an engine casing disposed concentrically with the central axis; a bearing outer ring secured to the engine casing and a bearing inner ring secured to the component, the bearing inner and outer rings cooperating for receiving roller elements therebetween, the bearing inner and outer rings located within a bearing cavity of the gas turbine engine; and a non-contacting seal assembly for fluidly separating the bearing cavity from an environment outside the bearing cavity, the non-contacting seal assembly having a sealing ring made of a metallic material housed by the engine casing and annularly and continuously extending about the central axis of the non-contacting seal assembly, the sealing ring radially spaced apart from the engine casing and movable relative to the engine casing in a radial direction relative to the central axis, the sealing ring and the component rotatable relative to each other about the central axis, the component cooperating with the sealing ring for defining respective sealing faces circumferentially extending around the central axis and facing the radial direction relative to the central axis, the sealing faces facing and spaced apart from each other by a controlled gap, at least one of the sealing faces being coated with a non-abradable material.

12. The gas turbine engine of claim 11, wherein the sealing face of the sealing ring is coated with a non-abradable material.

13. The gas turbine engine of claim 11, wherein the sealing ring has an annular face at an axial end thereof, the annular face extending from the sealing face in a radial direction relative to the central axis, the annular face being in axial contact with a wall of the engine casing that extends radially toward the component.

14. The gas turbine engine of claim 13, further comprising a retaining ring secured to the engine casing and extending radially toward the component, the retaining ring being axially spaced apart from the wall relative to the central axis, the sealing ring being located axially between the wall and the retaining ring.

15. The gas turbine engine of claim 13, further comprising a biasing member disposed axially between the retaining ring and the sealing ring for biasing the sealing ring in abutment against the wall.

16. The gas turbine engine of claim 11, wherein the sealing ring and the component have a same coefficient of thermal expansion.

17. The gas turbine engine of claim 11, wherein the non-abradable material is a ceramic-based coating.

18. A method of operating a non-contacting seal assembly, comprising:

rotating a sealing ring made of a metallic material relative to a counter component about a central axis, the sealing ring housed in a housing, and allowing radial movements relative to the central axis between the sealing ring and the housing;

fluidly connecting a bearing cavity to an environment outside the bearing cavity via a controlled gap defined between the sealing ring and the counter component, the controlled gap located between faces of the sealing ring and the counter component, the faces facing a radial direction relative to the central axis;

imparting a pressure differential between the environment and the bearing cavity for limiting lubricant of the bearing cavity from leaking in the environment; and avoiding a direct contact between a metallic material of the sealing ring and a material of the counter component with a non-abradable material disposed on at least one of the sealing ring and the counter component at the controlled gap.

\* \* \* \* \*